United States Patent
Nakahara et al.

(10) Patent No.: US 9,153,183 B2
(45) Date of Patent: Oct. 6, 2015

(54) DISPLAY APPARATUS AND ELECTRONIC APPARATUS

(71) Applicant: Japan Display West Inc., Aichi-Ken (JP)

(72) Inventors: Tae Nakahara, Tokyo (JP); Chihiro Tanaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 13/754,545

(22) Filed: Jan. 30, 2013

(65) Prior Publication Data

US 2014/0104147 A1     Apr. 17, 2014

(30) Foreign Application Priority Data

Mar. 21, 2012     (JP) .................... 2012-063881

(51) Int. Cl.
| | |
|---|---|
| G09G 3/36 | (2006.01) |
| G02F 1/1335 | (2006.01) |
| G09G 3/00 | (2006.01) |
| G09G 3/34 | (2006.01) |
| G02F 1/13 | (2006.01) |
| H04N 13/04 | (2006.01) |
| G02B 27/22 | (2006.01) |

(52) U.S. Cl.
CPC .......... *G09G 3/3607* (2013.01); *G02B 27/2214* (2013.01); *G02F 1/1323* (2013.01); *G02F 1/133514* (2013.01); *G09G 3/003* (2013.01); *G09G 3/3406* (2013.01); *H04N 13/0409* (2013.01); *H04N 13/0418* (2013.01); *H04N 13/0422* (2013.01); *G02F 2201/52* (2013.01); *H04N 2013/0463* (2013.01)

(58) Field of Classification Search
CPC ... G09G 3/3607; G09G 3/3406; G09G 3/003; G02F 1/133514; G02F 1/1323; G02F 2201/52; H04N 13/04; H04N 13/0409; H04N 13/0422; H04N 13/0418; H04N 2013/0463; G02B 27/2214
See application file for complete search history.

(56) References Cited

U.S. PATENT DOCUMENTS

| | | | | |
|---|---|---|---|---|
| 7,876,350 | B2* | 1/2011 | Shin et al. | 348/51 |
| 8,553,074 | B2* | 10/2013 | Cha et al. | 348/51 |
| 8,587,642 | B2* | 11/2013 | Shestak et al. | 348/56 |
| 2010/0309204 | A1* | 12/2010 | Smith et al. | 345/419 |

FOREIGN PATENT DOCUMENTS

| | | |
|---|---|---|
| JP | 2005-078092 | 3/2005 |
| JP | 2007-171906 A | 7/2007 |
| WO | WO-2008/035488 A1 | 3/2008 |

OTHER PUBLICATIONS

Japanese Office Action issued Mar. 3, 2015 for corresponding Japanese Application No. 2012-063881.

* cited by examiner

*Primary Examiner* — Andrew Sasinowski
(74) *Attorney, Agent, or Firm* — Michael Best & Friedrich LLP

(57) ABSTRACT

A display apparatus is configured to allow a user positioned in a first direction to visually recognize a first image and to allow a user positioned in a second direction different from the first direction to visually recognize a second image. The display apparatus includes a display unit that alternately displays the first and second images; an irradiation unit that provides irradiation light; a color filter that respectively includes first and second areas for the first and second images, through which the irradiation light is transmitted; and a distribution unit that distributes the irradiation light transmitted through the first area of the color filter to the first direction and through the second area of the color filter to the second direction. The color filter includes color components of three primary colors and a white color.

8 Claims, 8 Drawing Sheets

FIG.5

| l | r | l | r | l | r | l | r | l | r | l | r | l | r | l | r |
|---|---|---|---|---|---|---|---|---|---|---|---|---|---|---|---|
| R | G | B | R | G | W | R | G | B | R | G | B | R | G | B | R | G | W |

(Row 1 ends with ~22)

| R | G | B | R | G | B | R | G | B | R | G | W | R | G | B | R | G | B |
| R | G | B | R | G | W | R | G | B | R | G | B | R | G | B | R | G | W |
| R | G | B | R | G | B | R | G | B | R | G | B | R | G | W | R | G | B |

| R | G | B | R | G | B | W | R | G | B | R | G | B | W | R | G | B | R | G | B | W | ~22 |
| R | G | B | R | G | B | W | R | G | B | R | G | B | W | R | G | B | R | G | B | W |
| R | G | B | R | G | B | W | R | G | B | R | G | B | W | R | G | B | R | G | B | W |
| R | G | B | R | G | B | W | R | G | B | R | G | B | W | R | G | B | R | G | B | W |

FIG.9

| USE EXAMPLE | CASE | CONCEPT | LEFT (PASSENGER'S SEAT) | | | RIGHT (DRIVER'S SEAT) | | |
|---|---|---|---|---|---|---|---|---|
| | | | IMAGE | BACKLIGHT | | IMAGE | WHITE PIXELS | BACKLIGHT |
| 1 | LOW-POWER CONSUMPTION MODE/DURING DAY, AT NIGHT ETC. | REDUCE POWER CONSUMPTION | ALL | NORMAL LIGHTING | | W-INSERTION OK | LIGHTING | REDUCE POWER |
| 2 | | | | | | W-INSERTION NG | NON-LIGHTING | NORMAL LIGHTING |
| 3 | HIGH LUMINANCE MODE/UNDER DIRECT SUNLIGHT | IMPROVE VISIBILITY BY INCREASING LUMINANCE OF SCREEN | | | | ALL | LIGHTING | NORMAL |
| 4 | | | ALL | INCREASE LUMINANCE | | ALL | LIGHTING | INCREASE LUMINANCE |
| 5 | | | ALL | NORMAL LIGHTING | | NON-DISPLAY | NON-LIGHTING | |
| 6 | DISPLAY ONLY IMAGE "l" | | NON-DISPLAY | POWER MINIMUM | | NON-DISPLAY | NON-LIGHTING | POWER MINIMUM |
| 7 | DISPLAY ONLY IMAGE "r" | | | | | COMBINATION OF 1 TO 5 | | |

DISPLAY APPARATUS AND ELECTRONIC APPARATUS

FIELD

The present disclosure relates to a display apparatus and an electronic apparatus, and particularly relates to a display apparatus and an electronic apparatus suitably applied when different pictures are displayed with respect to different directions at the same time.

BACKGROUND

For example, there is a car navigation system to be mounted on an automobile which applies a display (hereinafter referred to as a dual-view display) capable of displaying an image for navigation with respect to a driver's seat and displaying another image (for example, a TV program and the like) with respect to a passenger's seat.

FIG. 1 shows an outline of the dual-view display. A dual-view display 1 can display an image "l" with respect to a user L positioned on the left side facing the dual-view display 1 and can display an image "r" with respect to a user R positioned on the right side facing the display. Naturally, it is possible to display the same image with respect to the user L and the user R (see JP-A-2005-78092 (Patent Document 1)).

FIG. 2 shows a schematic cross-sectional view of the dual-view display 1 shown in FIG. 1.

The dual-view display 1 is provided with a parallax barrier 11, a color filter 12, a liquid crystal layer 13 and a backlight 14 sequentially from an upper layer to a lower layer direction. In the drawing, only portions concerning dual-view display are shown, and a polarization plate, electrodes and so on concerning driving of the liquid crystal layer 13 are not shown.

The parallax barrier 11 distributes irradiation light from the lower layer to the user L or the user R. The color filter 12 includes color material films of three primary colors R, G and B having a sub-pixel size.

FIG. 3 shows an arrangement of three primary colors in the color filter 12 seen from the front of the dual-view display 1. Note that "l" in the drawing denotes vertical lines of the image "l" visually recognized by the user L and "r" in the drawing denotes vertical lines forming the image "r" recognized by the user "R".

Returning to FIG. 2, the liquid crystal layer 13 displays a combined image in which vertical-direction lines of the image "l" aimed at the user L and the image "r" aimed at the user R are alternately arranged in units of sub-pixels sectioned by R, G and B of the color filter 12. The liquid crystal layer 13 on an upper layer side is uniformly irradiated by the backlight 14.

In the dual-view display 1, the combined image generated by the liquid crystal layer 13 reaches the user L and the user R by the irradiation light from the backlight 14 through the color filter 12 and the parallax barrier 11. Accordingly, the user L can visually recognize the image "l" and the user R can visually recognize the image "r".

SUMMARY

As described above, transmittance of irradiation light is low in the dual-view display 1 due to the structure such that the irradiation light is distributed to right and left, and thus, a screen visually recognized by the user is liable to be darkened. Accordingly, in related art, the luminance of irradiation light is increased by increasing an output of the backlight 14, thereby securing the brightness of the screen visually recognized by the user.

However, when the output of the backlight 14 is increased, power consumption thereof is also increased. Therefore, a mechanism of securing the brightness of the screen visually recognized by the user without increasing power consumption is necessary.

In view of the above, it is desirable to secure the brightness of the screen visually recognized by the user.

An embodiment of the present disclosure is directed to a display apparatus allowing a user positioned in a first direction to visually recognize a first image and allowing a user positioned in a second direction different from the first direction to visually recognize a second image, which includes a display unit alternately displaying the first image and the second image, an irradiation unit irradiating the display unit displaying the first image or the second image with irradiation light, a color filter including a first area for the first image and a second area for the second image, through which the irradiation light transmitted through the display unit is transmitted, and a distribution unit distributing the irradiation light transmitted through the display unit and the first area of the color filter to the first direction and distributing the irradiation light transmitted through the display unit and the second area of the color filter to the second direction, in which the color filter includes color components of three primary colors and a white color.

One of the first area and the second area of the color filter may have color components of three primary colors and the white color, and the other may have color components of three primary colors.

The color filter may include the first area and the second area alternately arranged in lines.

The color filter may include the first area and the second area alternately arranged in lines in units of sub-pixels or in units of pixels.

The irradiation unit may include a first light-emitting unit emitting irradiation light directed to the first direction, and a second light-emitting unit emitting irradiation light directed to the second direction.

The irradiation unit may allow the first light-emitting unit to emit light in synchronization with a timing when the first image is displayed on the display unit, and may allow the second light-emitting unit to emit light in synchronization with a timing when the second image is displayed on the display unit.

The display apparatus may further include an irradiation control unit individually controlling light-emitting timings and outputs of the first light-emitting unit and the second light-emitting unit of the irradiation unit.

The display apparatus may further include an image signal correction unit performing correction processing to at least one of an image signal corresponding to the first image and an image signal corresponding to the second image.

In the embodiment of the present disclosure, the first image and the second image are alternately displayed on the display unit, the display unit displaying the first image or the second image is irradiated with irradiation light, the irradiation light transmitted through the display unit and the first area of the color filter is distributed to the first direction and the irradiation light transmitted through the display unit and the second area of the color filter is distributed to the second direction.

Another embodiment of the present disclosure is directed to an electronic apparatus allowing a user positioned in a first direction to visually recognize a first image and allowing a user positioned in a second direction different from the first direction to visually recognize a second image, which includes an image signal correction unit performing correction processing to at least one of an image signal corresponding to the first image and an image signal corresponding to the second image, a display unit alternately displaying the first image and the second image, an irradiation unit irradiating the display unit displaying the first image or the second image with irradiation light, a color filter including a first area for the first image and a second area for the second image, through which the irradiation light transmitted through the display unit is transmitted, and a distribution unit distributing the irradiation light transmitted through the display unit and the first area of the color filter to the first direction and distributing the irradiation light transmitted through the display unit and the second area of the color filter to the second direction, in which the color filter includes color components of three primary colors and a white color.

In another embodiment of the present embodiment, the correction processing is performed to at least one of the image signal corresponding to the first image and the image signal corresponding to the second image, the first image and the second image are alternately displayed on the display unit, the display unit displaying the first image or the second image is irradiated with irradiation light, the irradiation light transmitted through the display unit and the first area of the color filter is distributed to the first direction and the irradiation light transmitted through the display unit and the second area of the color filter is distributed to the second direction.

According to the embodiment of the present embodiment, it is possible to secure the brightness of the screen visually recognized by the user.

According to another embodiment of the present embodiment, it is possible to secure the brightness of the screen visually recognized by the user.

BRIEF DESCRIPTION OF THE DRAWINGS

FIG. 5 is a view showing an arrangement example of respective colors in a color filter with W;

FIG. 6 is a view showing another arrangement example of respective colors in the color filter with W;

FIG. 9 is a chart for explaining use examples of the display apparatus to which the embodiment of the present disclosure is applied.

DETAILED DESCRIPTION

Hereinafter, modes for carrying out the present disclosure (hereinafter referred to as an embodiment) will be explained in detail with reference to the drawings.
[Structure Example of Display Apparatus]

Figure 1:
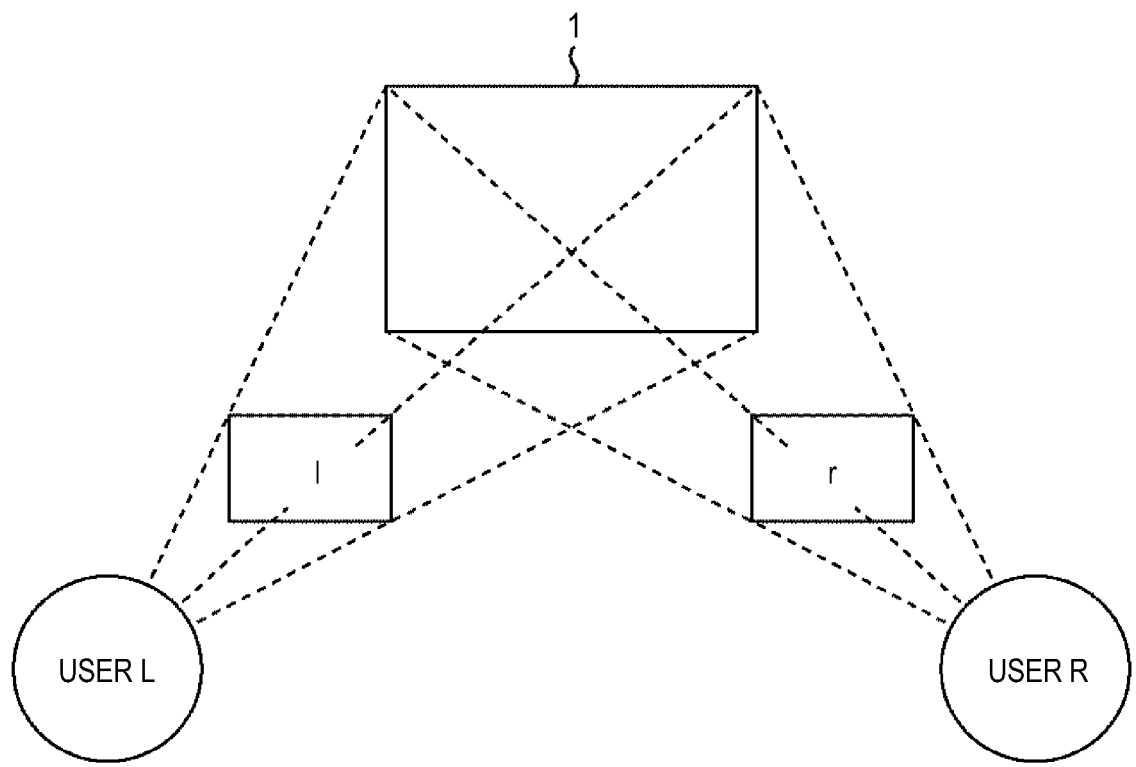
FIG. 1 is view showing an outline of a dual-view display.
Figure 2:
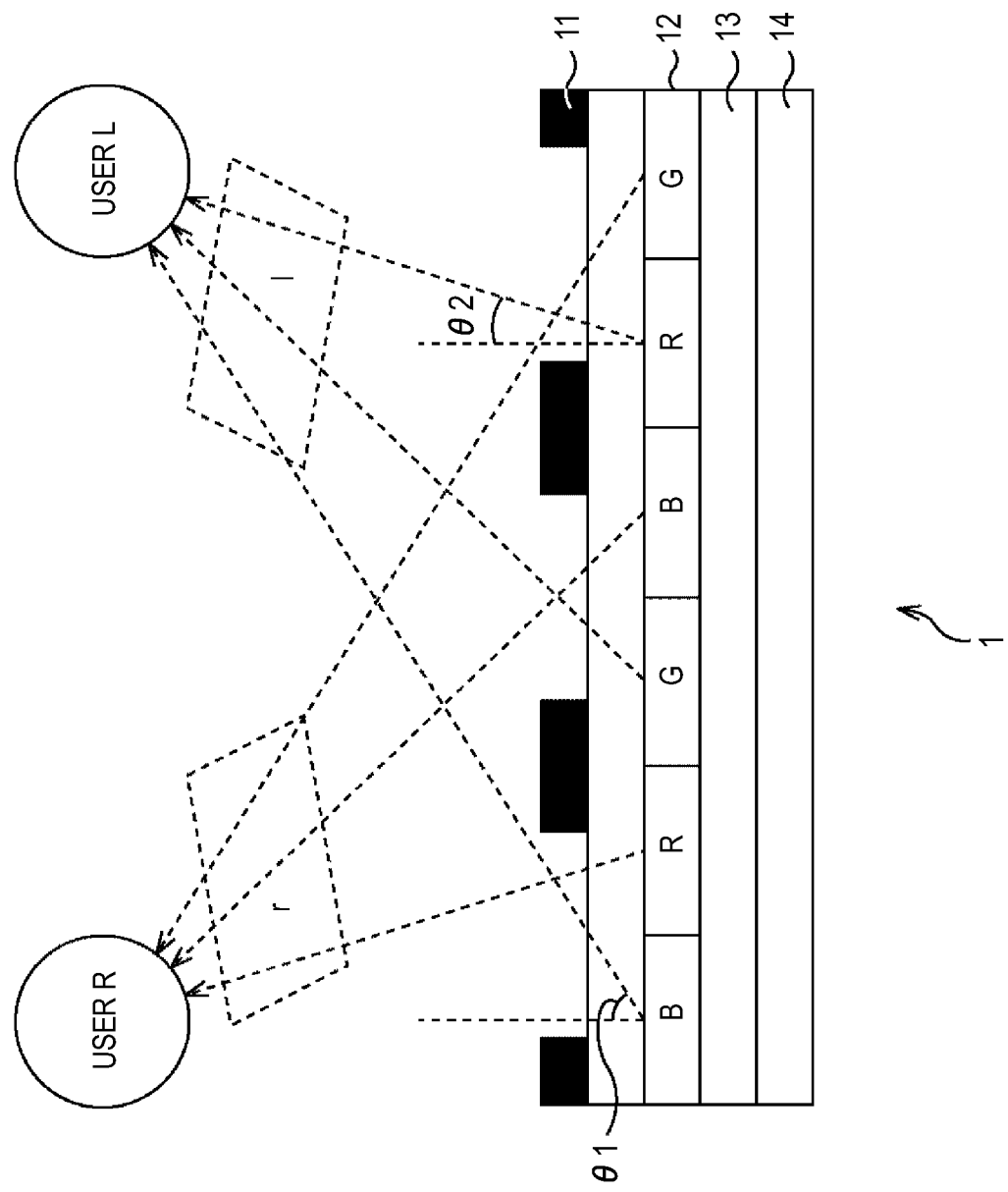
FIG. 2 is a schematic cross-sectional view of a related-art dual-view display.
Figure 3:
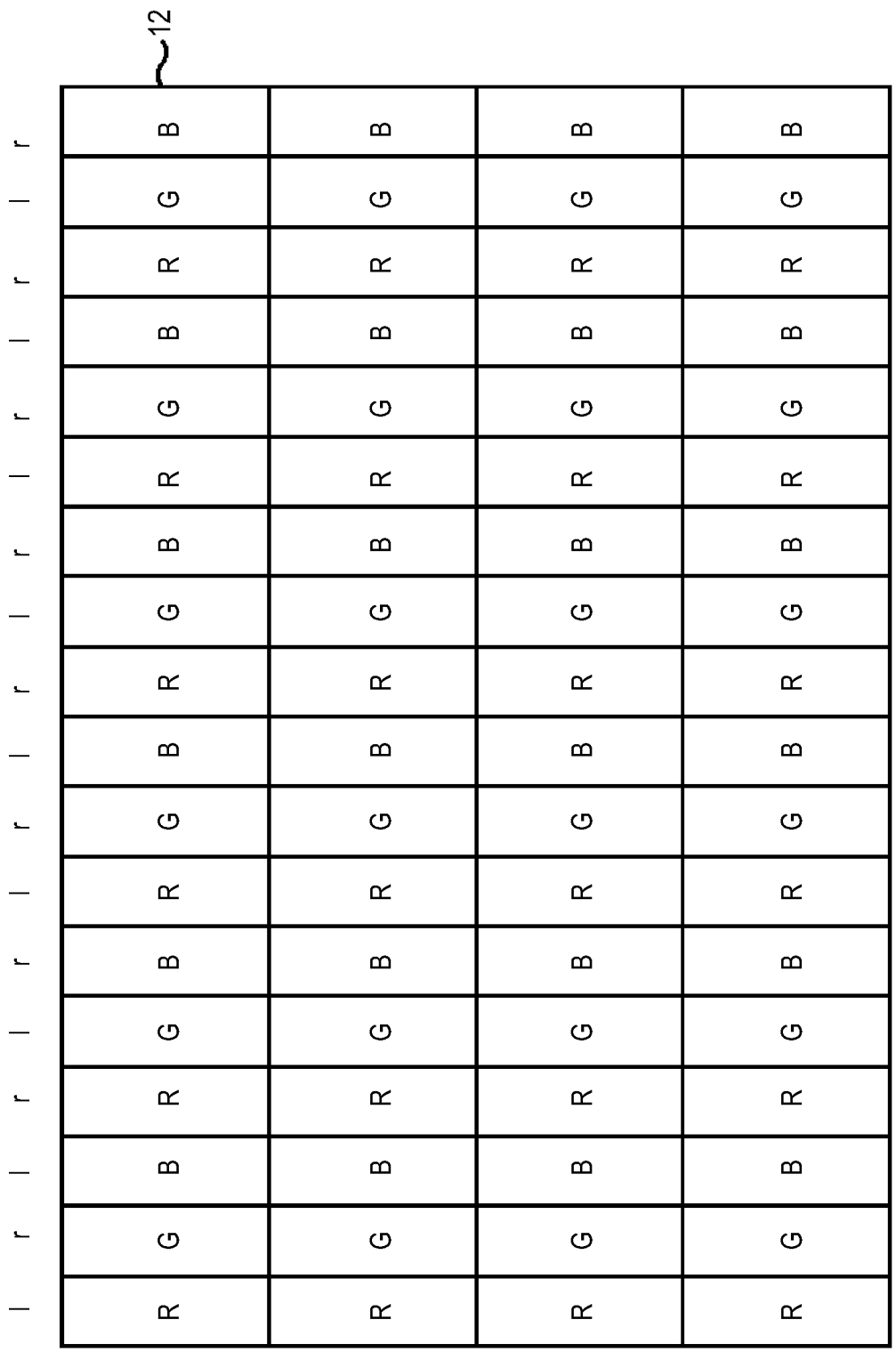
FIG. 3 is a view showing an arrangement of three primary colors in a related-art color filter.
Figure 4:
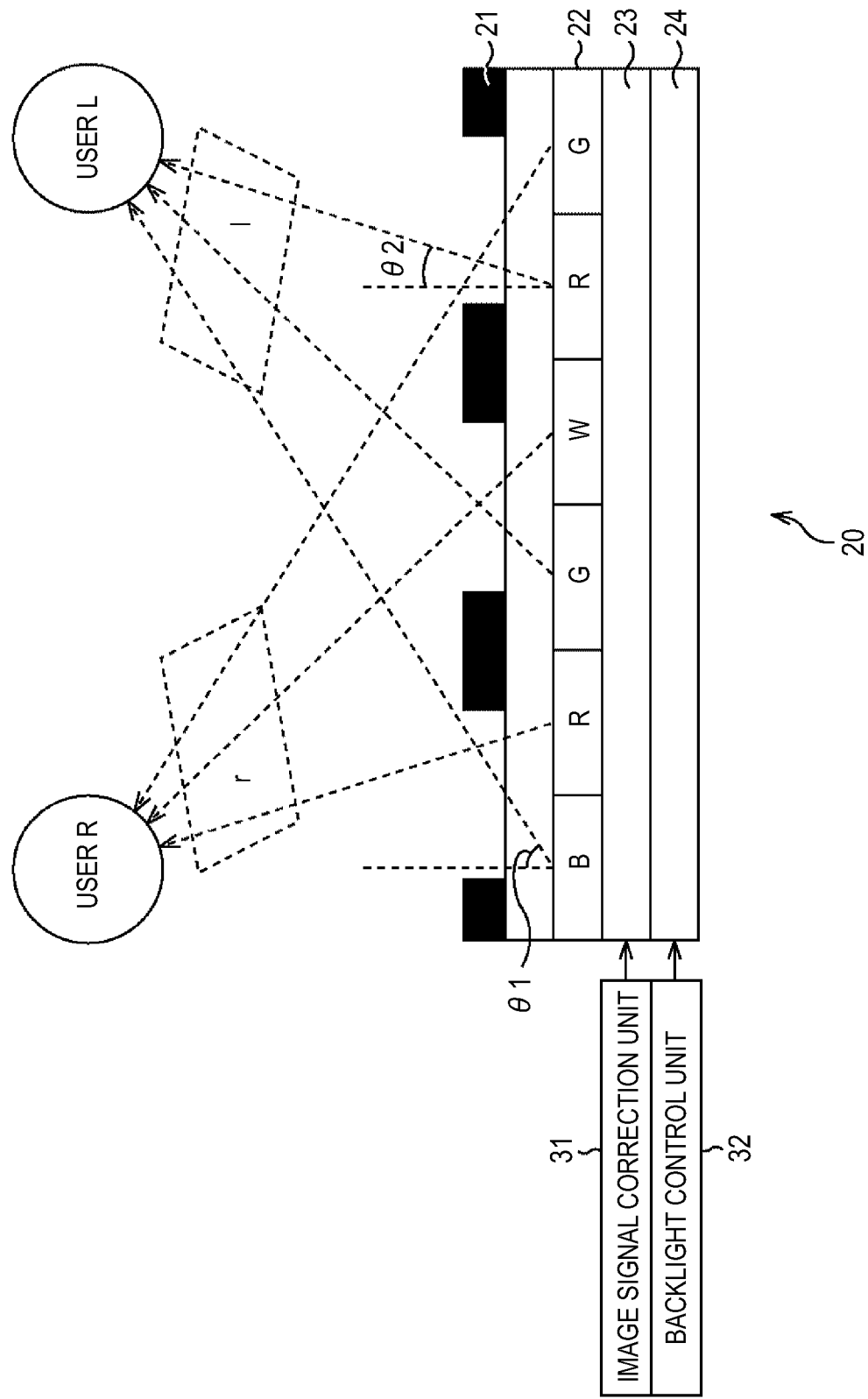
FIG. 4 is a schematic cross-sectional view of a display apparatus to which an embodiment of the present disclosure is applied.

FIG. 4 shows a schematic cross-sectional view of a display apparatus 20 according to the embodiment of the present disclosure.

The display apparatus 20 is applied to, for example, a car navigation system, displaying an image "l" with respect to a user L positioned on the left side facing the display apparatus 20, and displaying an image "r" which is different from the image "l" with respect to a user R positioned on the right side facing the display apparatus 20. Naturally, it is possible to display the same image with respect to the user L and the user R.

The display apparatus 20 is provided with a parallax barrier 21, a color filter with W 22, a liquid crystal layer 23 and a backlight 24 sequentially from an upper layer to a lower layer direction. The display apparatus 20 is also provided with an image signal correction unit 31 and a backlight control unit 32.

In the schematic cross-sectional view of the drawing, only portions concerning dual-view display are shown, and a polarization plate, electrodes and so on concerning driving of the liquid crystal layer 23 are not shown.

The parallax barrier 21 distributes irradiation light from the lower layer to the user L or the user R in units of sub-pixels. It is also preferable to use a lenticular lens instead of the parallax barrier 21.

The color filter with W 22 is formed by adding W (white) to three primary colors R, G and B having the sub-pixel size. As W is added to the three primary colors R, G and B, the brightness of the screen visually recognized by the user can be secured without increasing an output (luminance) of irradiation light. The present applicant has already published and shipped a liquid crystal module called "White Magic" in which W is uniformly arranged in the display.

FIG. 5 shows an arrangement example of three primary colors R, G, B and W in the color filter with W 22 seen from the front of the display apparatus 20. Note that "l" in the drawing denotes vertical lines of the image "l" visually recognized by the user L and "r" in the drawing denotes vertical lines forming the image "r" recognized by the user "R". The drawing corresponds to a case where the parallax barrier 21 distributes the image "l" and the image "r" in units of sub-pixels.

FIG. 6 shows another arrangement example of the color filter with W 22 seen from the front of the display apparatus 20. The drawing corresponds to a case where the parallax barrier 21 distributes the image "l" and the image "r" in units of pixels (in units of three sub-pixels in the case of only R, G and B, and in units of four sub-pixels in the case of including W in addition to R, G and B). "l" and "r" in the drawing are the same as in FIG. 5.

As shown in FIG. 5 and FIG. 6, in the color filter with W 22, W is not arranged uniformly over the entire filters but arranged only in one or the other of vertical lines for the image "l" and vertical lines for the image "r" (the image "r" in the present embodiment). Therefore, the brightness of only one of the image "l" and the image "r" can be corrected, and deterioration of image quality and so on which may occur as side effects of adding W can be prevented in the other image (the image "l" in the present embodiment) by the color filter with W 22.

As described above, the brightness of the image "r" can be corrected to be high, and the deterioration of image quality and so on which may occur as side effects of adding W can be prevented in the image "l" by the color filter with W 22. This is based on an idea where importance is attached to visibility with respect to the user R in the driver's seat and importance is attached to image quality with respect to the user L in the passenger's seat in the case where the image display apparatus 20 is applied to the car navigation system on an automobile in which a steering wheel is provided on the right side. Naturally, it is necessary to reverse the positional relationship when applied to the car navigation system on an automobile in which the steering wheel is provided on the left side.

Returning to FIG. 4, the liquid crystal layer 23 alternately displays the image "l" aimed at the user L and the image "r" aimed at the user R by switching them at high speed based on corrected image signals inputted form the image signal correction unit 31. The backlight 24 alternately irradiates a position of the user L and a position of the user R facing the liquid crystal layer 23 in a time division manner in accordance with control from the backlight control unit 32.

Figure 7:
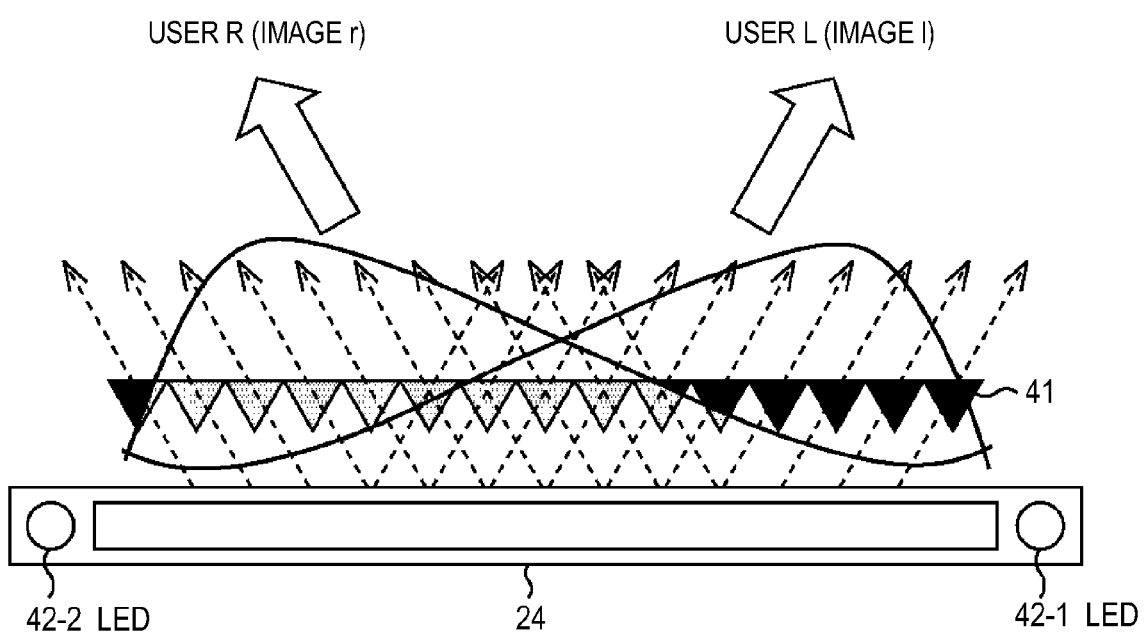
FIG. 7 is view showing a structure example of a backlight.

FIG. 7 shows a structure example of the backlight 24. The backlight 24 includes a light emitting film 41, an LED 42-1 arranged closer to the user L and LED 42-2 arranged closer to the user R. The light emitting film 41 directs irradiation light from the LED 42-1 toward the user L and directs irradiation light from the LED 42-2 toward the user R.

Returning to FIG. 4, the image signal correction unit 31 performs suitable image signal correction processing to at least one of an image signal of the image "l" and an image signal of the image "r" inputted from the previous stage.

The backlight control unit 32 allows the LED 42-1 and the LED 42-2 of the backlight 24 to alternately emit light in synchronization with a timing of switching between the image "l" and the image "r" by the liquid crystal layer 23. The backlight control unit 32 further controls outputs (luminance) of the LED 42-1 and the LED 42-2 of the backlight 24 individually.

Figure 8B:
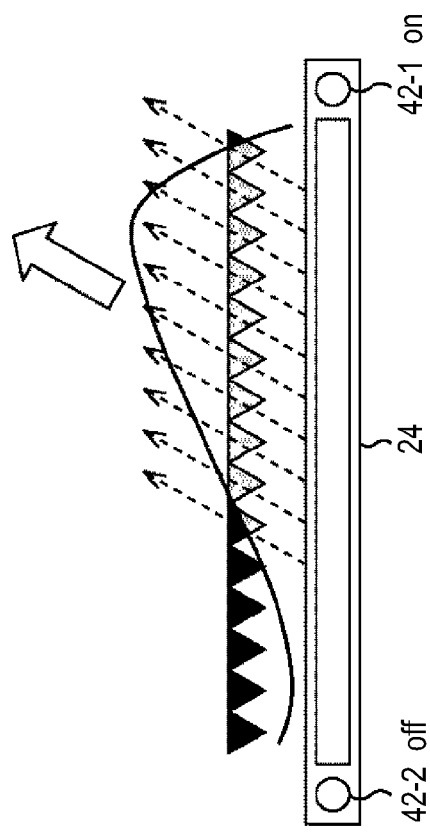
FIGS. 8A and 8B are views showing irradiation directions of the backlight.
Figure 8A:
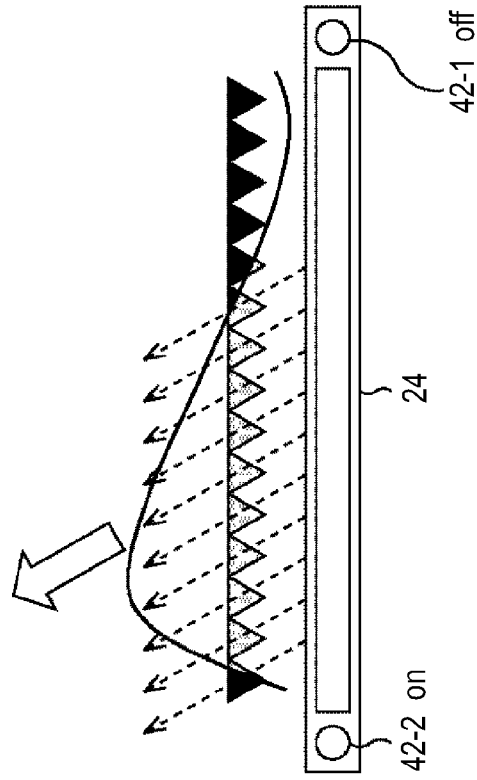

FIGS. 8A and 8B show states where an irradiation direction of the backlight 24 is switched by control of the backlight control unit 32.

FIG. 8A shows a state where the LED 42-1 is off and the LED 42-2 is on at a timing when the image "r" is displayed on the liquid crystal layer 23. At this time, the backlight 24 entirely irradiates the position of the user R. FIG. 8B shows a state where the LED 42-1 is on and the LED 42-2 is off at a timing when the image "l" is displayed on the liquid crystal layer 23. At this time, the backlight 24 entirely irradiates the position of the user L. The states of the FIG. 8A and FIG. 8B are alternately repeated while the image "l" and the image "r" are displayed on the display apparatus 20.

[Operation of Display Apparatus 20]

In the display apparatus 20, the image "l" and the image "r" are displayed by being switched at high speed by the liquid crystal layer 23, and the image "l" and the image "r" reach the user L and the user R by irradiation light from the backlight 24 through the color filter with W 22 and the parallax barrier 21. At this time, the image "l" visually recognized by the user L is not transmitted through W in the color filter with W 22, while the image "r" visually recognized by the user R is transmitted through W in the color filter with W 22. The irradiation light of the backlight 24 is applied to the position of the user L at the timing when the image "l" is displayed on the liquid crystal layer 23 and applied to the position of the user R at the timing when the image "r" is displayed on the liquid crystal layer 23.

Accordingly, the user L can visually recognize the image "l" in which deterioration of image quality does not occur as the side effect of W in the color filter with W 22, and the user R can visually recognize the image "r" in which brightness is corrected to be high as the effect of W in the color filter with W 22.

[Example of Utilizing Display Apparatus 20]

FIG. 9 shows seven types of use examples in the case of applying the display apparatus 20 to the car navigation system of the automobile in which the steering wheel is provided on the right side.

A use example 1 shows a low-power consumption mode aiming to reduce power consumption of the backlight 24, in which the image "r" with respect to the user R in the driver's seat is assumed to have an image content in which deterioration of image quality which may occur as the side effect of adding W does not visually affect the image. In this case, the image "l" with respect to the user L in the passenger's seat is displayed on the liquid crystal layer 23 as it is and the output (luminance) of the LED 42-1 of the backlight 24 irradiating the position of the user L is normal. On the other hand, the image "r" with respect to the user R in the driver's seat is not affected by the deterioration of image quality due to the addition of W, therefore, all pixels including W are displayed on the liquid crystal layer 23 and the output (luminance) of the LED 42-2 of the backlight 24 irradiating the position of the user R is reduced. In this case, the user L can visually recognize the image "l" with no deterioration of image quality. The user R can visually recognize the image "r" in which brightness is secured by W.

A use example 2 shows the low-power consumption mode aiming to reduce power consumption of the backlight 24, in which the image "r" with respect to the user R in the driver's seat is assumed to have an image content in which deterioration of image quality which may occur as the side effect of adding W visually affects the image. In this case, the image "l" with respect to the user L in the passenger's seat is displayed on the liquid crystal layer 23 as it is and the output (luminance) of the LED 42-1 of the backlight 24 irradiating the position of the user L is normal. On the other hand, deterioration of image quality due to the addition of W occurs in the image "r" with respect to the user R in the driver's seat, therefore, the image "r" which is corrected so that pixels of W are not displayed is displayed in the liquid crystal layer 23 and the output (luminance) of the LED 42-2 of the backlight 24 is normal. In this case, the user L can visually recognize the image "l" with no deterioration of image quality. The user R can visually recognize the image "r" in which brightness is secured as the backlight 24 is directed toward the user R in the irradiation manner.

A use example 3 shows a high luminance mode aiming to improve visibility by increasing the luminance of the screen in conditions such as under direct sunlight. In this case, the image "l" with respect to the user L in the passenger's seat is displayed on the liquid crystal layer 23 as it is and the output (luminance) of the LED 42-1 of the backlight 24 irradiating the position of the user L is normal. On the other hand, in the image "r" with respect to the user R in the driver's seat, all pixels including W are also displayed on the liquid crystal layer 23 and the output (luminance) of the LED 42-2 of the backlight 24 irradiating the position of the user R is normal. In this case, the user L can visually recognize the image "l" with no deterioration of image quality. The user R can visually recognize the image "r" in which brightness is increased by W.

A use example 4 shows the high luminance mode aiming to improve visibility by further increasing the luminance of the screen in conditions such as under direct sunlight. In this case, the image "l" with respect to the user L in the passenger's seat is displayed on the liquid crystal layer 23 as it is and the output (luminance) of the LED 42-1 of the backlight 24 irradiating the position of the user L is normal. On the other hand, in the image "r" with respect to the user R in the driver's seat, all pixels including W are also displayed on the liquid crystal layer 23 and the output (luminance) of the LED 42-2 of the backlight 24 irradiating the position of the user R is higher than the normal state. In this case, the user L can visually recognize the image "l" with no deterioration of image quality. The user R can visually recognize the image "r" in which brightness is further increased by the increase of luminance of the backlight 24 and by W.

A use example 5 shows the high luminance mode aiming to improve visibility by increasing the luminance of the screen in conditions such as under direct sunlight. In this case, the image "l" with respect to the user L in the passenger's seat is displayed on the liquid crystal layer 23 as it is and the output (luminance) of the LED 42-1 of the backlight 24 irradiating the position of the user L is higher than the normal state. On the other hand, in the image "r" with respect to the user R in the driver's seat, all pixels including W are also displayed on the liquid crystal layer 23 and the output (luminance) of the LED 42-2 of the backlight 24 irradiating the position of the user R is higher than the normal state. In this case, the user L can visually recognize the image "l" in which brightness is increased. The user R can visually recognize the image "r" in which brightness is further increased by the increase of luminance of the backlight 24 and by W.

A user example 6 shows a mode in which only the image "l" with respect to the user L in the passenger's seat is displayed. In this case, the image "l" with respect to the user L in the passenger's seat is displayed on the liquid crystal layer 23 as it is and the output (luminance) of the LED 42-1 of the backlight 24 irradiating the position of the user L is normal. On the other hand, the image "r" with respect to user R in the driver's seat is not displayed on the liquid crystal layer 23 and the output (luminance) of the LED 42-2 of the backlight 24 irradiating the position of the user R is minimum. In this case, only the user L can visually recognize the image "l" with no deterioration of image quality.

A user example 7 shows a mode in which only the image "r" with respect to the user R in the driver's seat is displayed. In this case, the image "l" with respect to the user L in the passenger's seat is not displayed on the liquid crystal layer 23, and the output (luminance) of the LED 42-1 of the backlight 24 irradiating the position of the user L is minimum. On the other hand, any one of the above use examples 1 to 5 is applied to the image "r" with respect to the user R in the driver's seat. In this case, only the user R can visually recognize the image "r" in which brightness is secured or increased.

As explained above, in the display apparatus 20, the image "r" visually recognized by the user R in the driver's seat can be displayed in a state where the brightness of the screen is secured or increased. It is also possible to suppress the deterioration of image quality by eliminating the effect of W depending on the image content.

It is also possible to display the image "l" visually recognized by the user L in the passenger's seat in a state where the brightness is secured or increased without causing deterioration of image quality.

It is further possible to reduce the power consumption of the backlight 24.

The display apparatus 20 can be applied to a game machine, a display for publicity and so on in addition to the car navigation system. In the display apparatus 20, W is arranged in vertical lines corresponding to the image "r" in the color filter with W 22, however, it is also possible to arrange W in vertical lines corresponding to the image "l".

The embodiment of the present disclosure is not limited to the above embodiment, and various modifications may occur within a scope not departing from the gist of the present disclosure.

The present disclosure contains subject matter related to that disclosed in Japanese Priority Patent Application JP 2012-063881 filed in the Japan Patent Office on Mar. 21, 2012, the entire contents of which are hereby incorporated by reference.

What is claimed is:

1. A display apparatus allowing a user positioned in a first direction to visually recognize a first image and allowing a user positioned in a second direction different from the first direction to visually recognize a second image, comprising:
   a display unit alternately displaying the first image and the second image;
   an irradiation unit irradiating the display unit displaying the first image or the second image with irradiation light;
   a color filter including a first area for the first image and a second area for the second image, through which the irradiation light transmitted through the display unit is transmitted; and
   a distribution unit distributing the irradiation light transmitted through the display unit and the first area of the color filter to the first direction and distributing the irradiation light transmitted through the display unit and the second area of the color filter to the second direction,
   wherein one of the first area and the second area of the color filter has color components of three primary colors and a white color, and
   the other has color components of three primary colors.

2. The display apparatus according to claim 1,
   wherein the color filter includes the first area and the second area alternately arranged in lines.

3. The display apparatus according to claim 2,
   wherein the color filter includes the first area and the second area alternately arranged in lines in units of sub-pixels or in units of pixels.

4. The display apparatus according to claim 1, wherein the irradiation unit includes
   a first light-emitting unit emitting irradiation light directed to the first direction, and
   a second light-emitting unit emitting irradiation light directed to the second direction.

5. The display apparatus according to claim 4,
   wherein the irradiation unit allows the first light-emitting unit to emit light in synchronization with a timing when the first image is displayed on the display unit, and allows the second light-emitting unit to emit light in synchronization with a timing when the second image is displayed on the display unit.

6. The display apparatus according to claim 4, further comprising:
   an irradiation control unit individually controlling light-emitting timings and outputs of the first light-emitting unit and the second light-emitting unit of the irradiation unit.

7. The display apparatus according to claim 1, further comprising:
   an image signal correction unit performing correction processing to at least one of an image signal corresponding to the first image and an image signal corresponding to the second image.

8. An electronic apparatus allowing a user positioned in a first direction to visually recognize a first image and allowing a user positioned in a second direction different from the first direction to visually recognize a second image, comprising:
   an image signal correction unit performing correction processing to at least one of an image signal corresponding to the first image and an image signal corresponding to the second image;
   a display unit alternately displaying the first image and the second image;

an irradiation unit irradiating the display unit displaying the first image or the second image with irradiation light;

a color filter including a first area for the first image and a second area for the second image, through which the irradiation light transmitted through the display unit is transmitted; and a distribution unit distributing the irradiation light transmitted through the display unit and the first area of the color filter to the first direction and distributing the irradiation light transmitted through the display unit and the second area of the color filter to the second direction, wherein one of the first area and the second area of the color filter has color components of three primary colors and a white color, and the other has color components of three primary colors.

* * * * *